(12) United States Patent
Lemercier et al.

(10) Patent No.: US 11,856,088 B2
(45) Date of Patent: Dec. 26, 2023

(54) REMOTE ASYNCHRONOUS KEY ENTRY

(71) Applicant: Entrust Datacard Corporation, Shakopee, MN (US)

(72) Inventors: Benoit Lemercier, Savage, MN (US); Kent Landerholm, Apple Valley, MN (US)

(73) Assignee: Entrust Corporation, Shakopee, MN (US)

( * ) Notice: Subject to any disclaimer, the term of this patent is extended or adjusted under 35 U.S.C. 154(b) by 68 days.

(21) Appl. No.: 17/190,084

(22) Filed: Mar. 2, 2021

(65) Prior Publication Data

US 2021/0273789 A1    Sep. 2, 2021

Related U.S. Application Data

(60) Provisional application No. 62/984,269, filed on Mar. 2, 2020.

(51) Int. Cl.
*H04L 9/08* (2006.01)
*H04L 9/14* (2006.01)

(52) U.S. Cl.
CPC .......... *H04L 9/0825* (2013.01); *H04L 9/0877* (2013.01); *H04L 9/0894* (2013.01); *H04L 9/14* (2013.01)

(58) Field of Classification Search
CPC ... H04L 9/0825; H04L 9/0877; H04L 9/0894; H04L 9/14
USPC .......................................................... 713/171
See application file for complete search history.

(56) References Cited

U.S. PATENT DOCUMENTS

| 9,954,680 | B1 * | 4/2018 | Machani ............... H04L 9/0825 |
| 10,084,600 | B1 * | 9/2018 | Irwan .................... H04L 9/3236 |
| 2004/0250066 | A1 * | 12/2004 | Di Luoffo .......... G06Q 20/4097 |
| | | | 713/168 |
| 2010/0138667 | A1 * | 6/2010 | Adams .................... G06F 21/83 |
| | | | 713/186 |
| 2012/0030739 | A1 | 2/2012 | Vadapalli et al. |

(Continued)

FOREIGN PATENT DOCUMENTS

| KR | 10-1837144 B1 | 3/2018 |
| WO | 2017/160471 A1 | 9/2017 |

OTHER PUBLICATIONS

International Search Report and Written Opinion for Application No. PCT/US2021/020517 dated Jun. 17, 2021.

*Primary Examiner* — Moeen Khan
(74) *Attorney, Agent, or Firm* — Merchant & Gould P.C.

(57) ABSTRACT

Methods and systems for remote, asynchronous key entry and extraction are provided. A credential device can store a first key thereon, and can store an encrypted key component. A hardware security module manages a key template including a plurality of key components. The hardware security module manages a complementary key to the first key. The key component on the credential device can be encrypted with the first key for storage on the credential device and decrypted by the complementary key at the hardware security module. Alternately, the key component can be encrypted with the complementary key and provided to the credential device for decryption at a secure system via the first key. Accordingly, a key custodian may supply or extract a key component at a hardware security module remotely and at a time convenient to that key custodian.

14 Claims, 16 Drawing Sheets

(56) References Cited

U.S. PATENT DOCUMENTS

| | | |
|---|---|---|
| 2015/0052359 A1 | 2/2015 | Castillo et al. |
| 2016/0173277 A1* | 6/2016 | Sakumoto ............. H04W 12/06 380/277 |
| 2016/0261408 A1* | 9/2016 | Peddada ............... H04L 9/0877 |
| 2021/0028931 A1* | 1/2021 | Ng .......................... H04L 9/085 |
| 2021/0226768 A1* | 7/2021 | Irazabal ................ H04L 9/0861 |

* cited by examiner

REMOTE ASYNCHRONOUS KEY ENTRY

CROSS-REFERENCE TO RELATED APPLICATIONS

The present application claims priority from U.S. Provisional Patent Application No. 62/984,269, filed on Mar. 2, 2020, the disclosure of which is hereby incorporated by reference in its entirety.

BACKGROUND

Management of secure cryptographic keys, particularly in the context of payment systems, often requires that each of a number of key custodians hold key components that must be combined at a hardware security module (HSM) to form a master key (e.g., a key encryption key). For example, smart cards that are delivered to a bank or other financial institution are often locked with a master key; those cards are required to be authenticated using the master key prior to use. Payment Card Industry (PCI) requirements dictate that key components (separate values that, when combined, form the value of a secret key, where each component does not reveal the key value) be held by at least two or more key custodians. This has the result of requiring a key "ceremony" in which each of the key custodians is required to physically bring a device that embodies that key custodian's key component, such that the key components may be combined at the same time and from the same location for formation of the central key. The key custodians may then manually enter, or extract the clear text key components from a physical key component storage device, at a central terminal.

As implemented, it is sometimes the case that a key custodian may securely transmit a key component to a proxy for the key custodian who is located at the HSM, and may perform the manual entry. However, in such cases, a first key custodian will transmit his/her key component and an acknowledgement is received. Then, a second key custodian will transmit his/her key component, and a second acknowledgement is received. This is repeated for each key custodian until all key components are collected for entry at the HSM for creation of the master key.

Such a configuration has obvious disadvantages in terms of lack of convenience. Specifically, each key custodian must be available at the same time, and in the same place, to perform a key injection process in which the key components are combined at the HSM to generate a secret key. However, key custodians cannot simply exchange or combine key components remotely, because those key components are typically maintained in cleartext and therefore transmission of those components would compromise security. Accordingly, logistics with respect to key injection or key component retrieval are often difficult, and increase as the number of key components increases.

SUMMARY

The present disclosure relates generally to methods and systems for remote asynchronous key entry, such as key injection or key extraction. The methods and systems described herein allow key custodians to provide key components from remote locations and at different times thereby simplifying the traditional key ceremony required to generate or extract a secure key in certain (e.g., PCI) environments.

In a first aspect, a method of enabling remote asynchronous master key entry is disclosed. The method includes, for each key custodian of a plurality of key custodians: receiving, at a key manager, a key component encrypted by a first injection key that is specific to the key custodian; decrypting the key component with a second injection key at a hardware security module; and storing the decrypted key component in a secure storage associated with the hardware security module. The method further includes, upon receipt of a complete set of key components including a key component from each of the plurality of key custodians, generating a secure key from the complete set of key components.

In a second aspect, a method of performing asynchronous key entry includes receiving a credential device having a first insertion key stored securely thereon, the insertion key pair being specific to the credential device. The method also includes entering a key component at a secure computing device for storage in a memory of the credential device upon connection of the credential device to the secure computing device, the key component being encrypted at the credential device by the first insertion key. The method further includes, at a key manager, using a reader to retrieve the encrypted key component from the credential device and transfer the encrypted key component to a hardware security module for decryption with a second insertion key.

In a third aspect, a method of performing remote asynchronous key extraction is disclosed. The method includes creating, via the hardware security module, a secure key in the secure storage. The method also includes creating a plurality of key components associated with the second secure key in the secure storage, the plurality of key components each relating to a different key custodian of a plurality of key custodians. The method further includes, for each key custodian of the plurality of key custodians: receiving a request, via a key manager, for a key component corresponding to the key custodian; encrypting a key component from among the second plurality of key components with a first extraction key associated with the key custodian; and transferring the encrypted key component to a credential device associated with the key custodian, the credential device having stored thereon a second extraction key.

BRIEF DESCRIPTION OF THE DRAWINGS

The following drawings are illustrative of particular embodiments of the present disclosure and therefore do not limit the scope of the present disclosure. The drawings are not to scale and are intended for use in conjunction with the explanations in the following detailed description. Embodiments of the present disclosure will hereinafter be described in conjunction with the appended drawings, wherein like numerals denote like elements.

DETAILED DESCRIPTION

Figure 1:
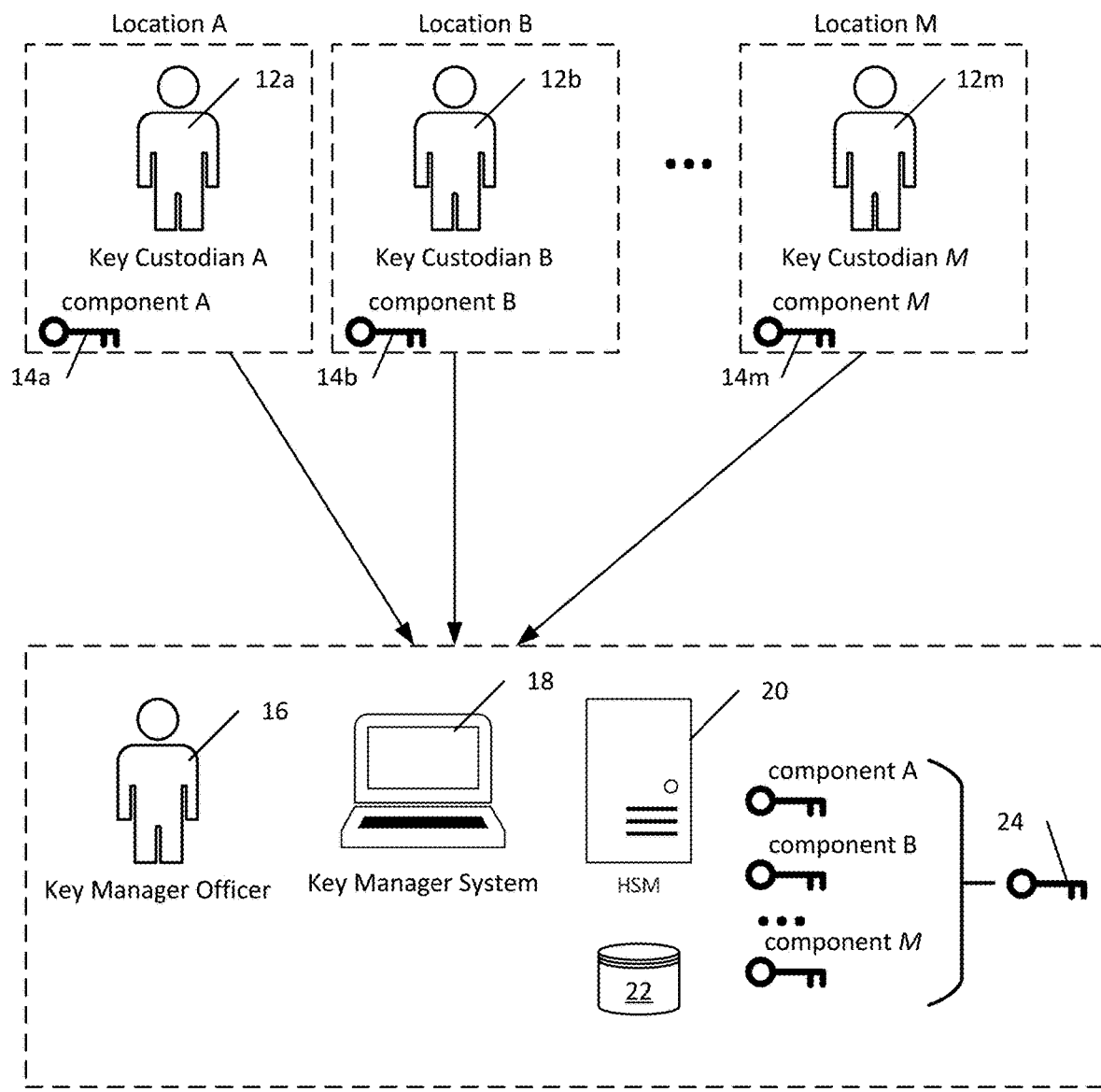
FIG. 1 illustrates an example diagram of an environment in which aspects of the present disclosure can be implemented.

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

As briefly described above, embodiments of the present invention are directed to methods and systems for remote asynchronous key entry, such as key injection or key extraction. The methods and systems described herein allow key custodians to provide key components from remote locations and at different times.

In general, rather than the concurrent key component entry at a common physical location utilized in typical existing systems, the present disclosure describes methods and systems for allowing key custodians to retrieve key components and to provide key components from remote locations and at different times, thereby drastically improving convenience to the key custodians. As described herein, each of the key components may be staged until all key components are loaded at which time a key manager officer may receive a notification and initiate a process to consolidate the key components to form a master key, also referred to herein as a secure key. Following formation of the master key, the key custodian's may be automatically notified and provided with some additional information (e.g., a key check value (KCV) or other similar confirming information).

Referring now to FIG. 1, an example environment 10 in which aspects of the present disclosure can be implemented is shown. In the environment 10, a plurality of key custodians, shown as key custodians 12*a-m* (or individually, as a key custodian 12) are located at one or more different locations. The locations may be, for example, different locations of an organization.

In accordance with distributed key custodian systems, each key custodian 12*a-m* has an associated key component 14*a-m*, respectively. In accordance with the present disclosure, a key component is a value from among a set of n values that, when combined, form a value of a secret key. Any subset of fewer than n values does not reveal the secret key, however once all of the n values are aggregated, the key may be recreated.

In the example shown, each key custodian 12 may communicate with a key manager system 18 which is managed by a key manager officer 16. The key custodians 12 may be located remotely from the key manager officer 16 and key manager system 18. In example embodiments, the key manager system 18 implements a software application used to manage one or more hardware security modules (HSMs), which manage access to secure storage that may be used for storing master keys or other sensitive key information. The key manager system 18 (referred to herein also as simply "key manager") is a remotely-accessible server application (e.g., a web-based application or other accessible application) that may be accessible to each of the key custodians 12 as well as the key manager officer 16.

In example embodiments, the key manager officer 16 corresponds to a person, or a quorum of persons having shared control, who is authorized to generate secret keys and enable extraction of keys, for example, from a particular HSM 20. In a particular example, the key manager officer 16 has specific authority to generate secret keys from key components, and enable extraction via key components. The key manager officer 16 may also have authority to facilitate key injection, which corresponds to generation of a secret key within a HSM for a secret key protected by that HSM.

As illustrated in FIG. 1, the key manager officer 16 may use the key manager system 18 to access the HSM 20, which in turn manages secure storage 22. The secure storage may store one or more secure keys 24, which may be reconstituted from key components 14 received from the key custodians 12. As noted above, to ensure compliance with payment system regulations, typically at least two or more key custodians 12 may be provided with two or more key components 14.

Figure 2:
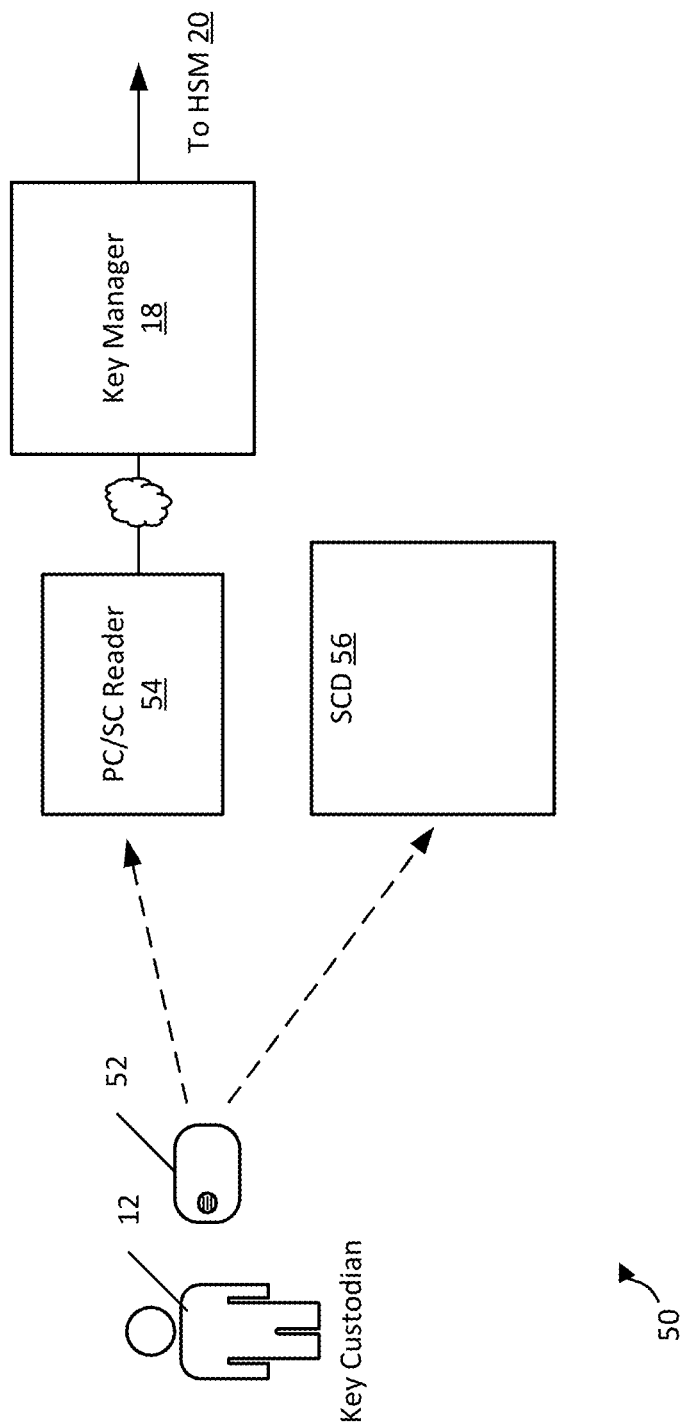
FIG. 2 illustrates example physical devices usable within the environment of FIG. 1 to implement aspects of the present disclosure.

Referring now to FIG. 2, an example environment 50 from the perspective of a given key custodian 12 is shown. In the example shown, the key custodian 12 may possess a physical credential, shown as a smart card 52. The physical credential may store, in accordance with the present disclosure, an encrypted version of the key component 14 that is received by the key custodian 12 remotely. Specifically, as further discussed below, a key custodian may receive a smart card 52, and may insert that smart card into a smart card reader 54. The smart card reader will receive a key component from the key manager 18 (e.g., from HSM 20) and allow the smart card 52 to store an encrypted version of the key component 14 within a memory of the smart card 52. The key custodian 12 may then insert the smart card 52 into a secure computing device (SCD) 56, which can be used to access, decrypt, and display the key component 14 so that the key custodian 12 may record the decrypted key component. Conversely, the key custodian 12 may insert the smart card 52, manually enter the key component 14 at the SCD 56, and cause the smart card 52 to encrypt the key component 14 for storage within a memory of the smart card. Accordingly, the key custodian 12 may then insert the smart card 52 into a smart card reader 54 for transmission of the encrypted key component to the key manager 18. The key manager 18, or HSM 20, may decrypt the encrypted key component and aggregate key components for injection of a secure key.

In example embodiments, a different set of asymmetric keys may be used for key injection and key extraction, and different sets of asymmetric keys may be used for each key custodian. In still further embodiments, different symmetric keys may be used for each key custodian. Details regarding use of such keys are provided below.

Figure 3:
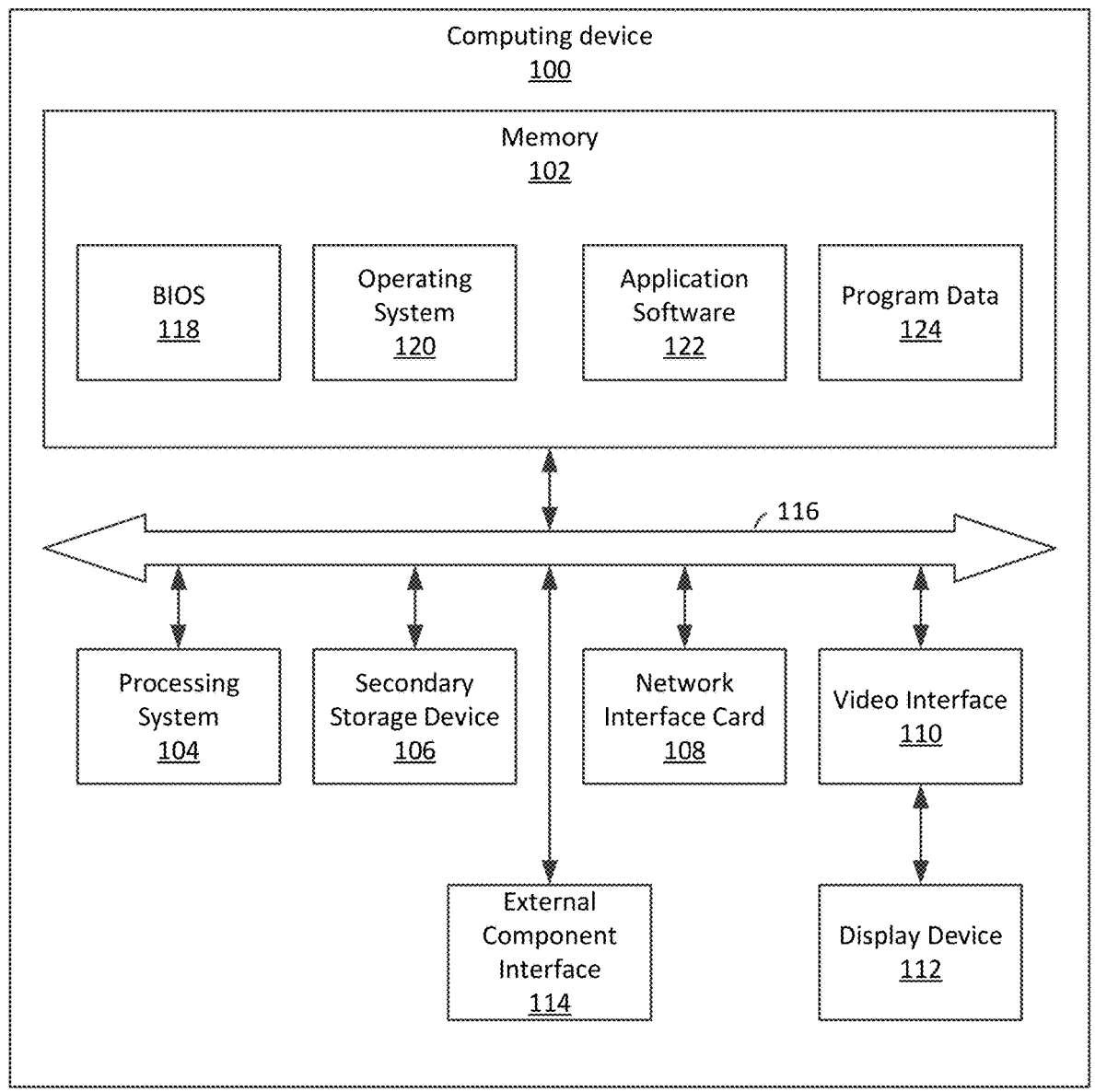
FIG. 3 illustrates an example computing device usable to implement aspects of the present disclosure.

Referring now to FIG. 3, a computing device 100 is shown, with which aspects of the present disclosure can be implemented. The computing device 100 can be used, for example, to implement any of devices 12-18 as described above in connection with FIGS. 1-2.

In the example of FIG. 3, the computing device 100 includes a memory 102, a processing system 104, a secondary storage device 106, a network interface card 108, a video interface 110, a display unit 112, an external component interface 114, and a communication medium 116. The memory 102 includes one or more computer storage media capable of storing data and/or instructions. In different embodiments, the memory 102 is implemented in different ways. For example, the memory 102 can be implemented using various types of computer storage media, and generally includes at least some tangible media. In some embodiments, the memory 102 is implemented using entirely non-transitory media.

The processing system 104 includes one or more processing units, or programmable circuits. A processing unit is a physical device or article of manufacture comprising one or more integrated circuits that selectively execute software instructions. In various embodiments, the processing system 104 is implemented in various ways. For example, the processing system 104 can be implemented as one or more physical or logical processing cores. In another example, the processing system 104 can include one or more separate microprocessors. In yet another example embodiment, the processing system 104 can include an application-specific integrated circuit (ASIC) that provides specific functionality. In yet another example, the processing system 104 provides specific functionality by using an ASIC and by executing computer-executable instructions.

The secondary storage device 106 includes one or more computer storage media. The secondary storage device 106 stores data and software instructions not directly accessible by the processing system 104. In other words, the processing system 104 performs an I/O operation to retrieve data and/or software instructions from the secondary storage device 106. In various embodiments, the secondary storage device 106 includes various types of computer storage media. For example, the secondary storage device 106 can include one or more magnetic disks, magnetic tape drives, optical discs, solid-state memory devices, and/or other types of tangible computer storage media.

The network interface card 108 enables the computing device 100 to send data to and receive data from a communication network. In different embodiments, the network interface card 108 is implemented in different ways. For example, the network interface card 108 can be implemented as an Ethernet interface, a token-ring network interface, a fiber optic network interface, a wireless network interface (e.g., WiFi, WiMax, etc.), or another type of network interface.

The video interface 110 enables the computing device 100 to output video information to the display unit 112. The display unit 112 can be various types of devices for displaying video information, such as an LCD display panel, a plasma screen display panel, a touch-sensitive display panel, an LED screen, a cathode-ray tube display, or a projector. The video interface 110 can communicate with the display unit 112 in various ways, such as via a Universal Serial Bus (USB) connector, a VGA connector, a digital visual interface (DVI) connector, an S-Video connector, a High-Definition Multimedia Interface (HDMI) interface, or a DisplayPort connector.

The external component interface 114 enables the computing device 100 to communicate with external devices. For example, the external component interface 114 can be a USB interface, a FireWire interface, a serial port interface, a parallel port interface, a PS/2 interface, and/or another type of interface that enables the computing device 100 to communicate with external devices. In various embodiments, the external component interface 114 enables the computing device 100 to communicate with various external components, such as external storage devices, input devices, speakers, modems, media player docks, other computing devices, scanners, digital cameras, and fingerprint readers.

The communication medium 116 facilitates communication among the hardware components of the computing device 100. The communications medium 116 facilitates communication among the memory 102, the processing system 104, the secondary storage device 106, the network interface card 108, the video interface 110, and the external component interface 114. The communications medium 116 can be implemented in various ways. For example, the communications medium 116 can include a PCI bus, a PCI Express bus, an accelerated graphics port (AGP) bus, a serial Advanced Technology Attachment (ATA) interconnect, a parallel ATA interconnect, a Fiber Channel interconnect, a USB bus, a Small Computing system Interface (SCSI) interface, or another type of communications medium.

The memory 102 stores various types of data and/or software instructions. The memory 102 stores a Basic Input/Output System (BIOS) 118 and an operating system 120. The BIOS 118 includes a set of computer-executable instructions that, when executed by the processing system 104, cause the computing device 100 to boot up. The operating system 120 includes a set of computer-executable instructions that, when executed by the processing system 104, cause the computing device 100 to provide an operating system that coordinates the activities and sharing of resources of the computing device 100. Furthermore, the memory 102 stores application software 122. The application software 122 includes computer-executable instructions, that when executed by the processing system 104, cause the computing device 100 to provide one or more applications. The memory 102 also stores program data 124.

The program data 124 is data used by programs that execute on the computing device 100.

Although particular features are discussed herein as included within an electronic computing device 100, it is recognized that in certain embodiments not all such components or features may be included within a computing device executing according to the methods and systems of the present disclosure. Furthermore, different types of hardware and/or software systems could be incorporated into such an electronic computing device.

In accordance with the present disclosure, the term computer readable media as used herein may include computer storage media and communication media. As used in this document, a computer storage medium is a device or article of manufacture that stores data and/or computer-executable instructions. Computer storage media may include volatile and nonvolatile, removable and non-removable devices or articles of manufacture implemented in any method or technology for storage of information, such as computer readable instructions, data structures, program modules, or other data. By way of example, and not limitation, computer storage media may include dynamic random access memory (DRAM), double data rate synchronous dynamic random access memory (DDR SDRAM), reduced latency DRAM, DDR2 SDRAM, DDR3 SDRAM, solid state memory, read-only memory (ROM), electrically-erasable programmable ROM, optical discs (e.g., CD-ROMs, DVDs, etc.), magnetic disks (e.g., hard disks, floppy disks, etc.), magnetic tapes, and other types of devices and/or articles of manufacture that store data. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

It is noted that, in some embodiments of the computing device 100 of FIG. 3, the computer-readable instructions are stored on devices that include non-transitory media. In particular embodiments, the computer-readable instructions are stored on entirely non-transitory media, e.g., in memory 102.

Referring now to FIGS. 4-8, flowcharts of methods for setup, as well as remote asynchronous key insertion and key extraction are provided. In accordance with the methods described herein, key custodians may be allowed to either retrieve key components or provide key components from a remote location and at a time convenient to the key custodian.

In accordance with the disclosure in FIGS. 4-8, it is noted that a physical credential, such as a smart card 52, is prepared for each of the key custodians who will be receiving a key component 14. Additionally, two different key pairs (e.g., public/private key pairs, or alternatively, symmetric keys) are generated for each key custodian/smart card.

For example, in the case asymmetric key pairs are used, a first public/private key pair ($PbI_{(m)}$, $PrI_{(m)}$) is generated for key injection, and a second public/private key pair ($PbE_{(m)}$, $PrE_{(m)}$) is generated for key extraction. Of these key pairs, the public key for key injection $PbI_{(m)}$ and the private key for key extraction $PrE_{(m)}$ are stored on the smart card of the corresponding key custodian such that those keys cannot be extracted from the smart card. The corresponding keys, including the private key for key injection $PrI_{(m)}$ and the public key for key extraction $PbE_{(m)}$, are persisted in the secure storage 22 of the HSM 20 such that those keys also cannot be extracted.

In the alternative case where symmetric keys are used, an insertion key ($KI_{(m)}$) and an extraction key ($KE_{(m)}$) may be used. These keys are, similarly, specific to the key custodian and smart card (and therefore, to the particular key component). In this instance, both keys are stored on the smart card of the corresponding key custodian, such that the keys cannot be extracted from the smart card. A copy of these symmetric keys is also persisted in the secure storage 22 of the HSM 20 so that they cannot be extracted.

Once appropriate keys are generated and persisted at the smart card and the HSM 20, the prepared smart card is then provided to the corresponding key custodian 12. Once the key custodians 12 have received their respective smart cards, key insertion and key extraction may occur remotely and asynchronously.

Figure 4:
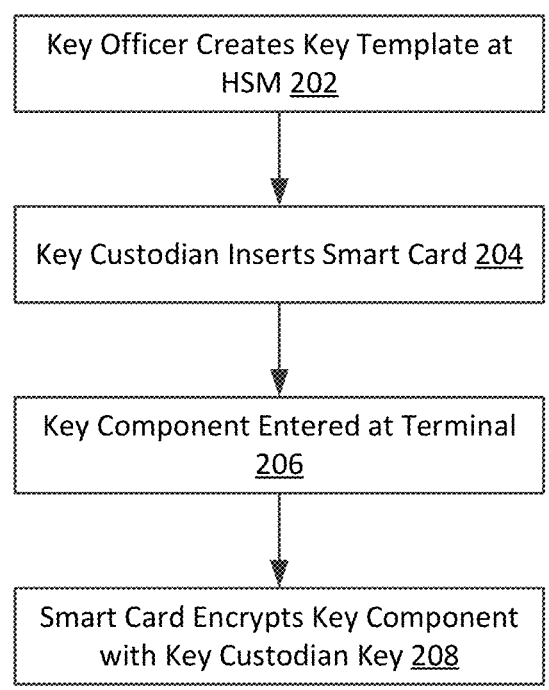
FIG. 4 illustrates a flowchart of a method of performing remote asynchronous key injection for a particular key component, according to an example embodiment.

FIG. 4 illustrates a flowchart of a method 200 for key injection within an environment in which a remote asynchronous key entry may be accomplished. The method 200 may be performed, for example, within the environments described above in conjunction with FIGS. 1-3. However, use of the hardware systems described above are intended as exemplary within the method 200 as well as those methods described in FIGS. 5-8.

In the example shown, a key officer, such as a key manager officer 16, will create a key template at a hardware security module 20 (step 202). The key template may include, for example, properties of a secure key (e.g., a master key) that is to be generated from a plurality of key components. The template may define, for example, a key type, a bit length, one or more key usage parameters, and additional attributes of the key. Upon completion of selection of the key template, the key manager officer 16 may notify each of the plurality of key custodians 12 that key component loading may be initiated.

Figure 10:
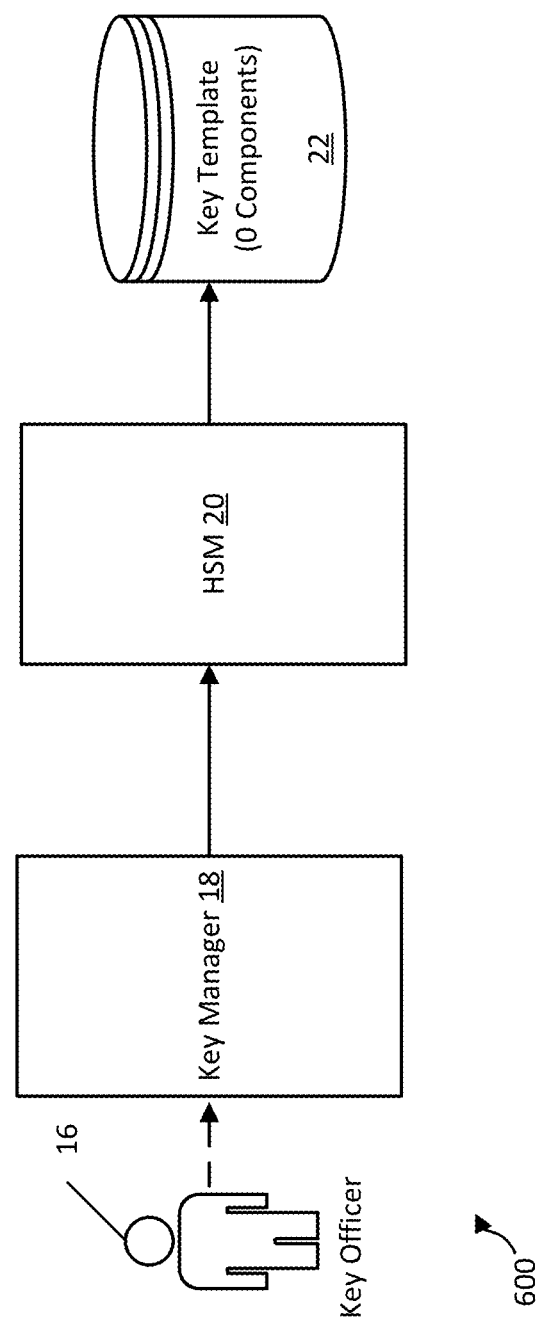
FIG. 10 is a schematic process diagram of preparation for remote asynchronous key injection or extraction by a key manager, using the methods and systems described herein.

In the example shown, a key custodian 12 may insert a smart card 52 into a secure computing device (SCD) 56 (step 204). This may result in the SCD 56 allowing the key custodian to enter the key component, e.g., by manually keying in the values included in the key component at a terminal provided by the SCD 56 (step 206). An example illustration of such a process is seen in FIG. 10.

Figure 11:
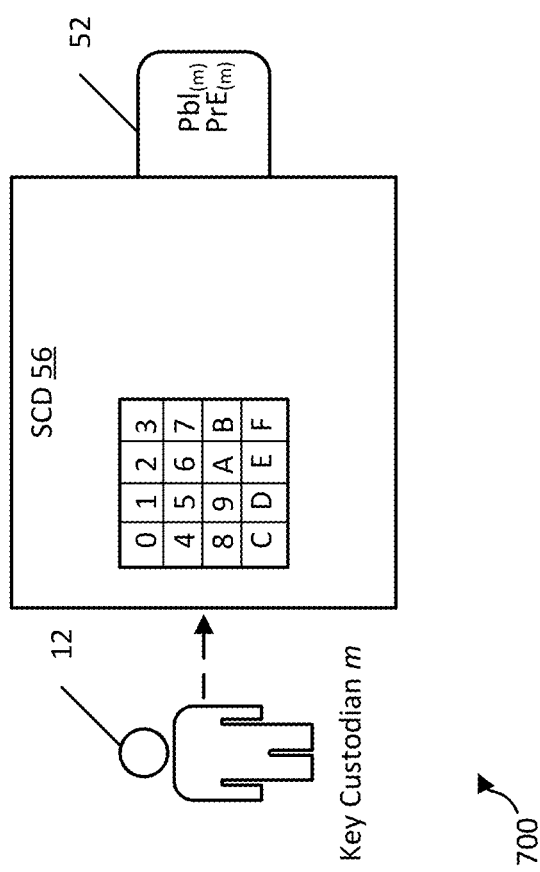
FIG. 11 is a further schematic process diagram of preparation for remote asynchronous key injection or extraction by a key custodian, using the methods and systems described herein.

In the example shown, the smart card 52 may then encrypt the key component that was entered using an asymmetric key stored on the smart card 52 of the key custodian (step 208). In example embodiments, a public key of the key custodian may be used, and was previously stored on the smart card 52. The public key of the key custodian may be, for example, a public key of an injection key pair (e.g., for a key component m, $PbI_{(m)}$ which is a public/private key pair (e.g., $PrI_{(m)}$, $PbI_{(m)}$). An example illustration of such a process is seen in FIG. 11. Of course, in alternative embodiments, a symmetric injection key (e.g., $KI_{(m)}$) may be stored on the smart card, where symmetric keys are used instead of asymmetric keys.

Figure 5:
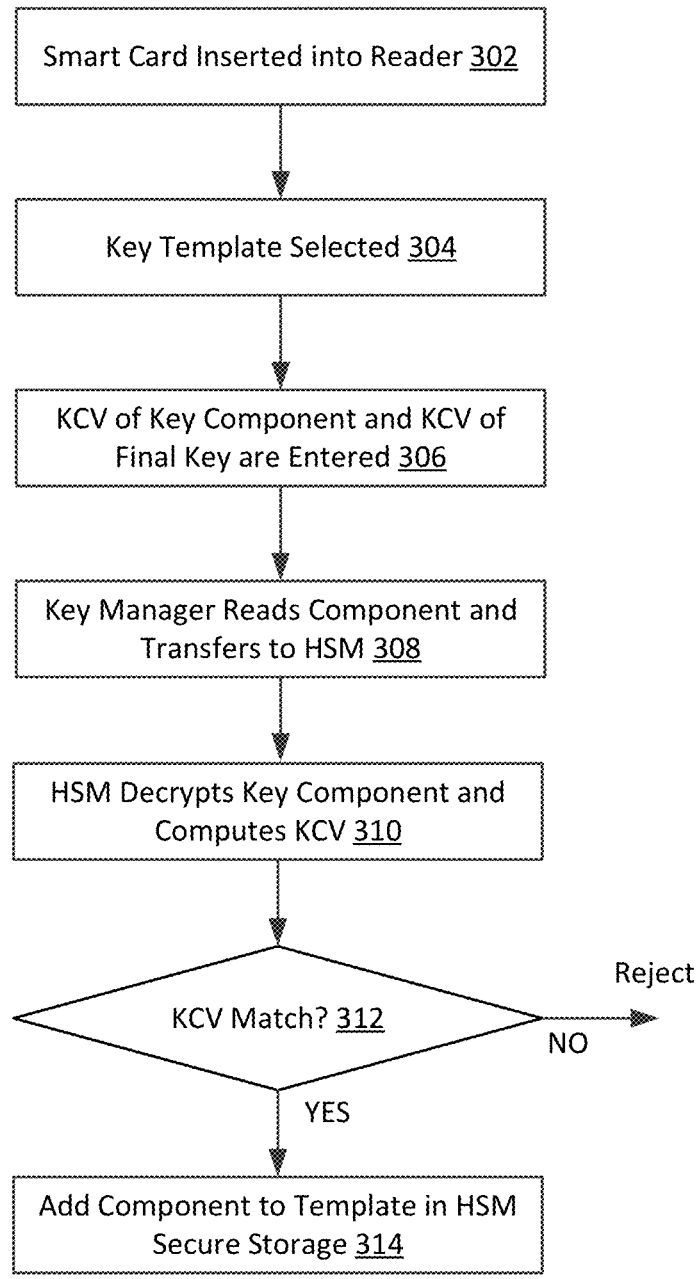
FIG. 5 illustrates a flowchart of a method of performing remote asynchronous key injection for a particular key component, according to an example embodiment.

Continuing with FIG. 5, a flowchart of a method 300 is illustrated, which corresponds to operations performed in response to a key custodian 12 providing a key component 14 for purposes of key injection. In example embodiments, the method 300 may be performed at some time after the key custodian 12 causes the encrypted key component to be stored on a credential device such as a smart card 52.

In the example shown, the key custodian 12 may provide the smart card 52 to a smart card reader 54 (step 302). The key custodian may also select a particular key template using the key manager 18 (step 304). In such an example, the smart card reader 54 may be associated with a computing system usable to access the key manager 18. The key custodian can then provide a key check value (KCV) of the key component as well as a key check value of the final key (step 306) to the key manager 18.

In the example shown, the key manager 18 will read the key component 14 from the smart card 52, and transfer the key component 14 to the HSM 20 (step 308). At this time, in some embodiments, the key component 14 is encrypted with the public key ($PbI_{(m)}$) of an injection key pair as noted above. In alternative embodiments, the key component 14 is encrypted with a symmetric injection key ($KI_{(m)}$). Additionally, the key manager 18 will, once the key component 14 is transferred, delete the key component from the smart card 52.

Continuing with this example, in some embodiments, the HSM 20 decrypts the key component 14 using a private key of the injection key pair (e.g., $PrI_{(m)}$) (step 310). In alternative embodiments, the HSM 20 can decrypt the key component 14 using the symmetric injection key (e.g., $KI_{(m)}$) managed at the HSM. The HSM 20 will also compute the key check value of the key component. The HSM 20 can then determine whether a key check value (KCV) of the key component and a key check the value of the key template match key check values entered by the key custodian (step 312). If the key check values do not match, the key component may be rejected. However, if the key check values match, the key component will be added to the key template in the secure storage 22 by the HSM 20 (step 314).

Figure 6:
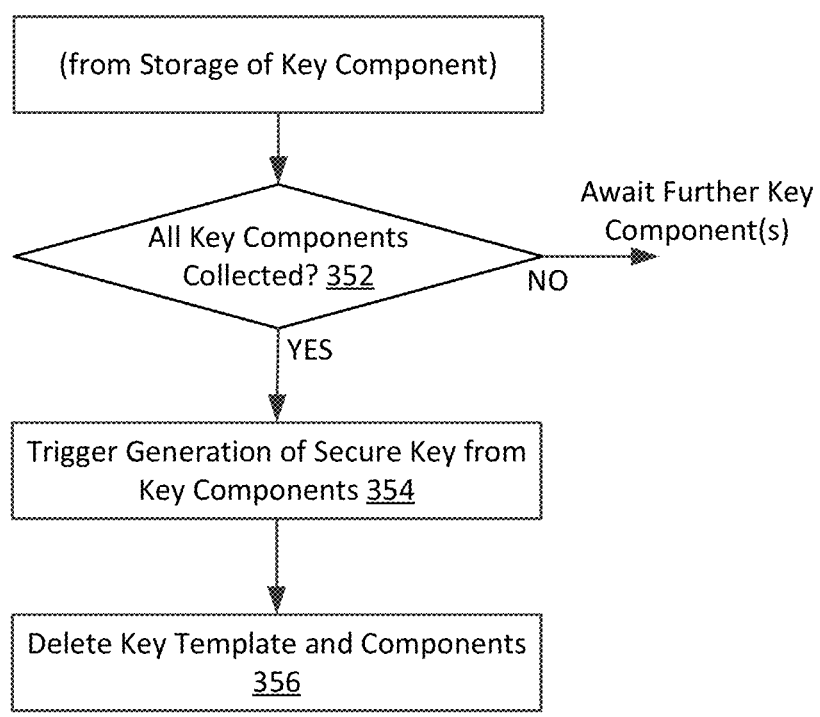
FIG. 6 illustrates a flowchart of a method of performing remote asynchronous key injection as key components are aggregated from key custodians, according to an example embodiment.
Figure 13:
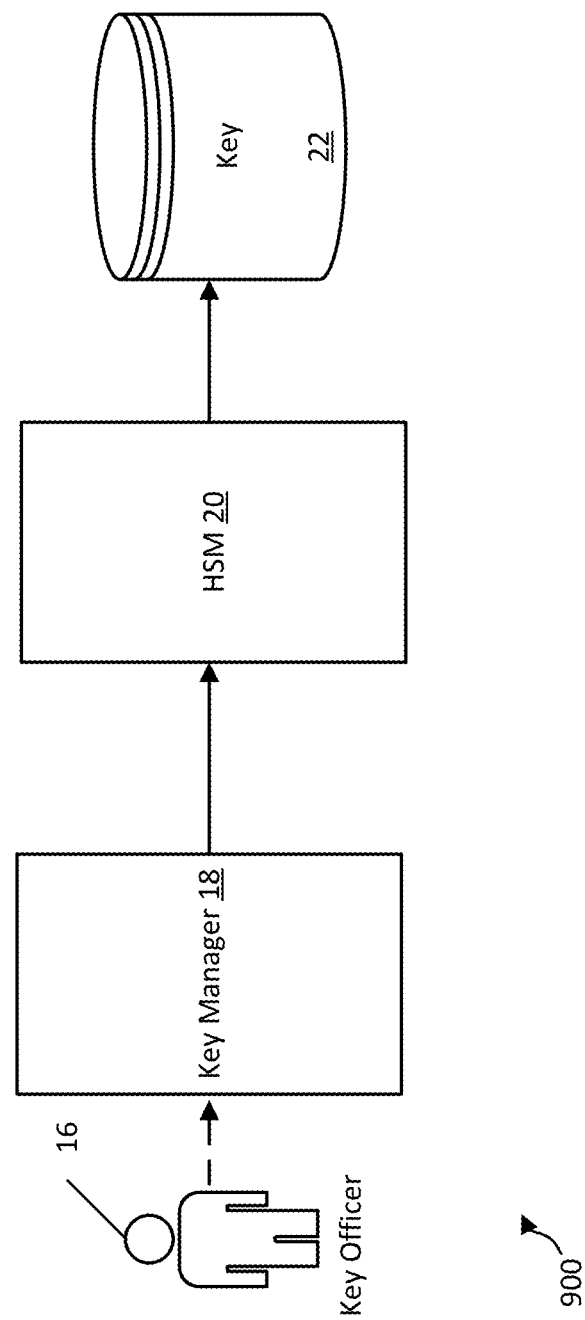
FIG. 13 is a schematic process diagram illustrating key creation by a key manager officer as part of a remote asynchronous key injection process, using the methods and systems described herein.

Continuing with FIG. 6, a process 350 is illustrated which forms an injected key from key components received at the HSM 20, according to an example embodiment. In the example shown, the HSM 20 will determine whether all key components of a particular key have been collected (step 352). As noted above, to create a secure key, all of the key components that were created from the secure key are required to be provided, while any one key component will not inform of the value of the key. If fewer than all of the key components have been collected by the HSM 20, it will await further key components being received. Accordingly, each of the key custodians may opt to provide their respective key component at a time convenient to that key custodian. Once all key components have been collected, a key manager officer 16 may initiate the generation of a secure key from the key components (step 354). The key may be generated using the properties defined by the key template. Following formation of the secure key, the key template, as well as all of the key components, are deleted in the secure storage 22 (step 356). An example of this circumstance is depicted in FIG. 13, described in further detail below.

Figure 7:
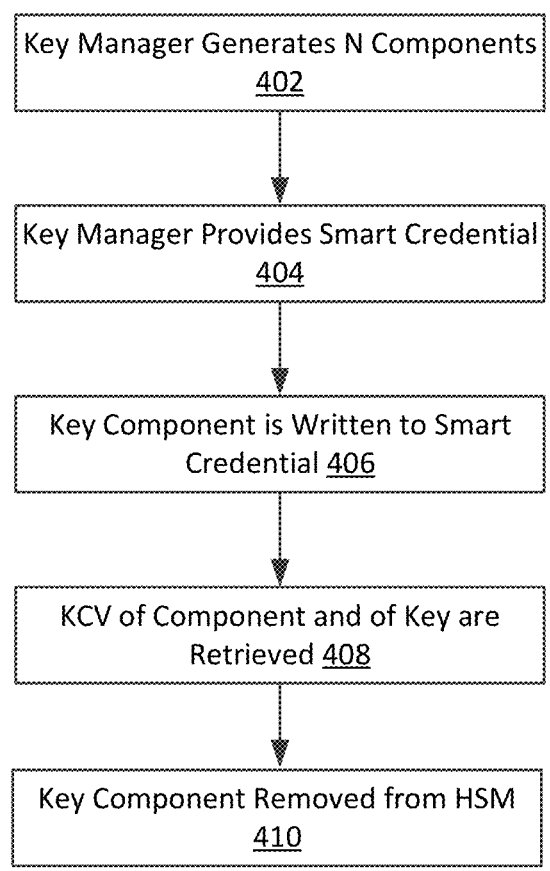
FIG. 7 illustrates a flowchart of a method of performing remote asynchronous key extraction at a hardware security module, according to an example embodiment.

Referring now to FIG. 7, a flowchart of a method 400 is shown describing extraction of a key component based on a secure key managed by the HSM 20. The method 400 is usable to, for example, distribute key components to key custodians based on a secure key.

In the example shown, a key manager officer 16 will generate a plurality of key components (e.g., m key components) using the HSM 20 (step 402). This may occur, for example, at the time the secure key is formed. However in some embodiments, the key components may be formed after creation of the secure key. Each of the key components can be associated with an extraction key. For example, the extraction key can be provided as a public/private key pair (e.g., $PrE_{(m)}$, $PbE_{(m)}$) or as a symmetric extraction key (e.g., $KE_{(m)}$) unique to each key component. Each of the key components is encrypted using the extraction key, e.g., the public key ($PbE_{(m)}$) of the extraction key pair or the symmetric extraction key ($KE_{(m)}$). This may occur, for example, at the time the key components are generated. In this case, the encrypted key components are stored in secure storage 22. In alternative embodiments, the key components are encrypted only at the time of distribution to a key custodian. In such cases, the key components are stored in clear text in secure storage 22.

In the example shown, the key manager officer 16 or other entity will provide to each of the key custodians a secure credential, such as a smart card 52 (step 404). In such cases, the secure credential may have stored thereon one or more encryption keys. In particular, the secure credential may have stored thereon a relevant extraction key, e.g., at least a private key of the extraction key pair or a symmetric extraction key.

Each key custodian 12 may now perform one or more operations to obtain key components from the HSM 20. In the embodiment shown, the key custodian will insert a smart card 52 into a smart card reader 54 that is accessible to the key manager 18. The key custodian 12 may then use the key manager to retrieve a particular key component 14 which is written to the smart card 52 (step 406). It is noted that the key component 14, at this time, is encrypted using an extraction key, such as the public key ($PbE_{(m)}$) of an extraction key pair, or a symmetric extraction key ($KE_{(m)}$). Additionally, a key check value of the key component 14, and of the key 24, are retrieved (step 408). These key check values may be used, for example, in validating a later entered key component, such as in the manner described above in conjunction with FIG. 5. Finally, once the key component is confirmed to be stored on the smart card 52, the key component 14 for that particular key custodian 12 may be removed from the secure storage 22 (step 410).

In accordance with the method 400, it is noted that steps 404-410 may be performed at different times for each key custodian 12, such that each key custodian may receive a smart card, access the key manager 18, and retrieve a key component and associated key check values, at times that our convenience to the key custodian. Additionally, the key custodians do not need to be in the same location or perform these steps at the same time nor in any particular order.

Figure 8:
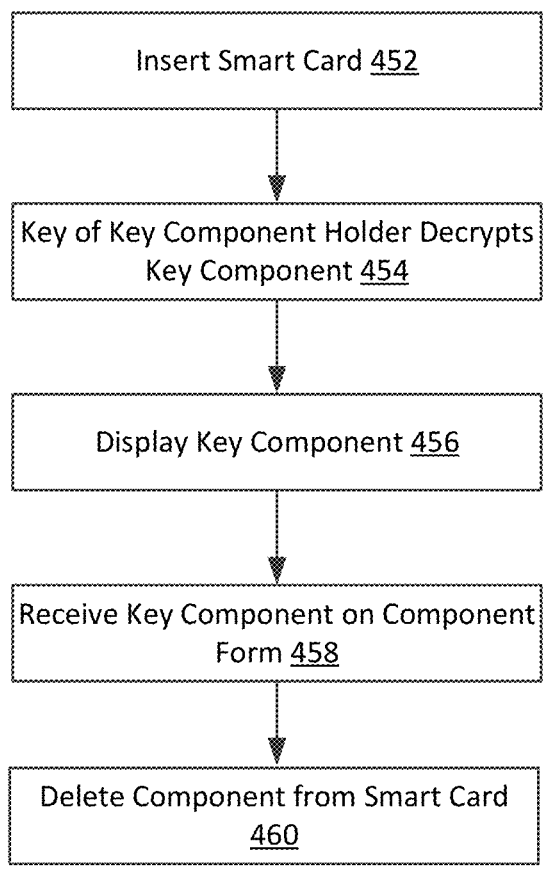
FIG. 8 illustrates a flowchart of a method of performing remote asynchronous key extraction including receipt of a particular key component by a key custodian, according to an example embodiment.

Continuing the process for key extraction, referring to FIG. 8, a flowchart of a method 450 is shown for recreating a key component from a credential device such as a smart card 52. In the example shown, a key custodian will insert a smart card at a secure computing device (SCD) 56 (step 452). At the SCD 56, the smart card 52 will use the private key ($PrE_{(m)}$) of the extraction key pair, or a complementary symmetric extraction key ($KE_{(m)}$), to decrypt the key component 14 (step 454). The SCD 56 will then display the key component in clear text on a display (step 456).

In the example shown, the key custodian 12 will then provide the key component onto a form, for example manually by writing the values displayed on a key component form (step 458). Once the key custodian 12 confirms that key or has completed writing the key component values onto a key component form, the secure computing device 56, and/or smart card 52, will delete the key component 14 from the smart card 52 (step 460). Specifically, once the key component has been captured on the key component form, there is no need to retain even an encrypted version of the key component on the smart card 52; therefore, it is deleted to maintain security.

Referring now to FIGS. 9-16, example process diagrams are illustrated which depict the various steps required for remote asynchronous key injection and extraction. Specifically, the process diagrams illustrate particular portions of the process ease previously described, in a particular embodiment. Specifically, FIGS. 9-16 illustrate the processes generally outlined above through use of asymmetric keys (e.g., public/private key pair arrangements); however, it is recognized that, as discussed above, symmetric keys could be used as well. In either event, separate insertion and extraction keys (or key pairs) are used, and unique keys (or key pairs) are used for each key component of a master (secure) key that is being managed.

Figure 9:
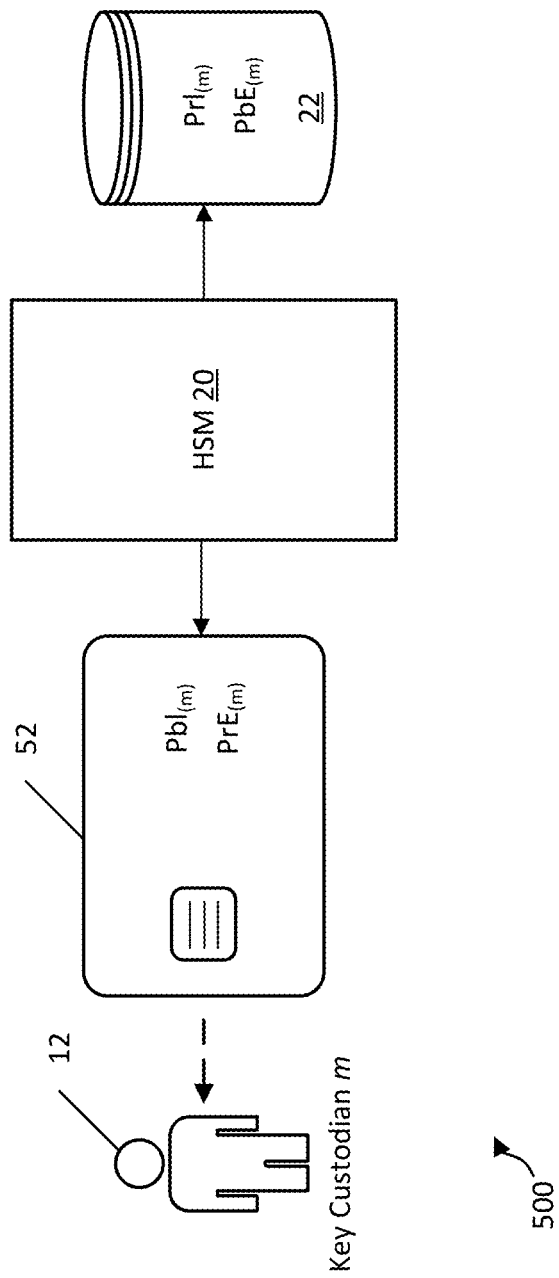
FIG. 9 is a schematic process diagram of preparation for remote asynchronous key injection or extraction by a key custodian, using the methods and systems described herein.

In FIG. 9, a process 500 by which preparation for key injection and key extraction is illustrated. In the example shown, two public/private key pairs are generated for each key custodian 12. A physical credential, such as a smart card 52, is inserted into the HSM 20, and two keys are written to the credential. Specifically, the key custodian's public key for injection and private key for extraction ($PbI_{(m)}$, $PrE_{(m)}$) are written to the credential. In the example shown, a key custodian 12 will receive the physical credential.

Referring to FIG. 10, a process 600 by which a key is loaded by the HSM 20 is depicted. In the example shown, a key officer 16 creates a template for a new master key via a key manager 18. The template describes key properties, such as a type, bit length, usage, and other characteristics for a given key. The key officer 16 then transmits a communication to the key custodians 12 that loading of key components may be initiated.

Referring to FIG. 11, a process 700 by which key components are loaded onto a smart card is illustrated. In particular, a key custodian 12 will insert a physical credential, such as a smart card 52, into a secure computing device (SCD) 56. The key custodian 12 will then enter the key component 14 using a keypad of the SCD 56. The physical credential, such as a smart card 52, will encrypt the key component using the key custodian's public key of the public/private key pair used for key insertion (e.g., for a key component m, $PbI_{(m)}$). The encrypted key component will then be stored in a memory of the physical credential.

Figure 12:
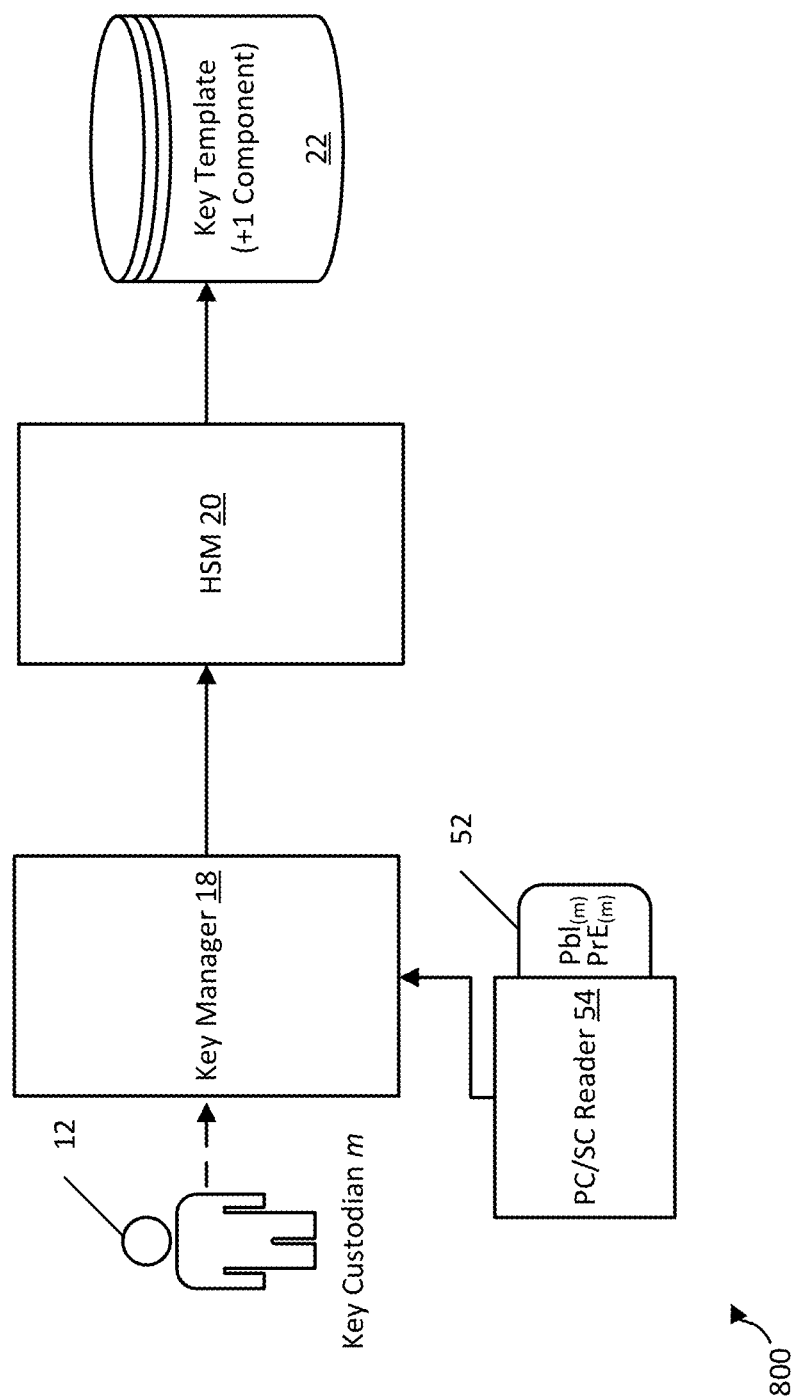
FIG. 12 is a schematic process diagram illustrating key component delivery to a hardware security module (HSM) by a key custodian as part of a remote asynchronous key injection process, using the methods and systems described herein.

FIG. 12 illustrates a process 800 by which the encrypted key component may be transferred to the HSM 20. In the example shown, the key custodian 12 will use a key manager 18 to load the encrypted key component from the physical credential, attached to the key template. In particular, the physical credential will be accessed by a reader, such as a smart card reader 54, which provides the encrypted key component to the key manager 18. The key manager 18 will forward the encrypted key component to the HSM 20, which may decrypt the key component 14 using be private key of the public private key pair used for key insertion (e.g., for a key component m, $PrI_{(m)}$). The now decrypted key component may be stored and protected by the HSM 20, e.g., in secure storage 22.

In example embodiments, within process 800, additional steps may be performed to validate the key component prior to storage in secure storage 22. For example, a key manager officer 16 may select a particular key template, and key check values (KCVs) of the key component and a final key may be entered. As the key component is read by, for example, the smart card reader 54, the key component will be deleted from smart card 52. The HSM 20 can then decrypt the key component 14 and compute its key check value. If the key check value of the component corresponds to the key check value stored in the key template and KCVs entered by the key custodian, the component may be added to the key template in the secure storage 22.

FIG. 13 illustrates a process 900 by which a key manager officer 16 can complete a key injection process, e.g., by reformulating the key from a complete set of key components. In example embodiments, the process 900 depicted in FIG. 13 can be used to implement the method described above in conjunction with FIG. 6. In the example shown, the key manager officer 16 may utilize the key manager 18 to access HSM 20. The key manager officer 16 creates a secure key using the properties defined by the key template. The key template and key components are then deleted.

It is noted that, in creation of the secure key, each of the key components associated with a key template must be associated with a corresponding injection key pair. Specifically, each public injection key must only be used to provide one component per key template.

Figure 14:
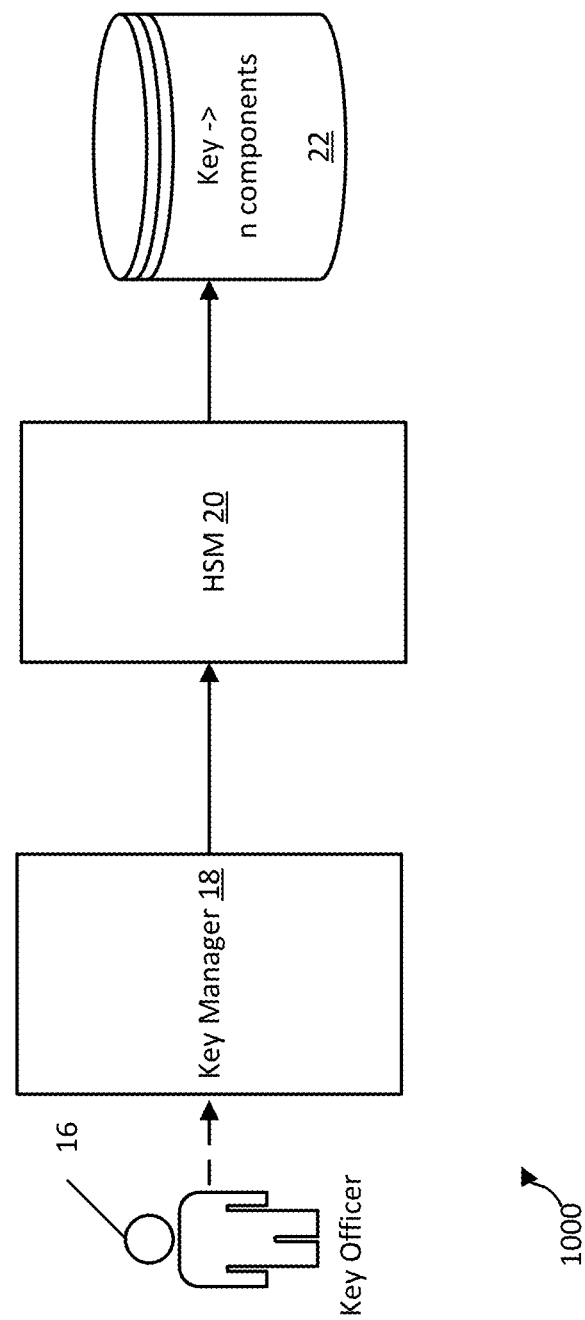
FIG. 14 is a schematic process diagram illustrating key component creation by a key manager officer as part of a remote asynchronous key extraction process, using the methods and systems described herein.

FIG. 14 illustrates a process 1000 by which a key (e.g., key 24 of FIG. 1) may be created from loaded key components, in accordance with an example embodiment. In the example shown, a key manager officer 16 may use the key manager 18 to access the HSM 20 once all key components 14 are loaded from each key custodian 12. As noted above, in certain embodiments two or more key custodians, and therefore two or more key components, will be used. The key manager officer 16 will formulate the key 24 from the complete set of key components using the HSM 20.

Figure 15:
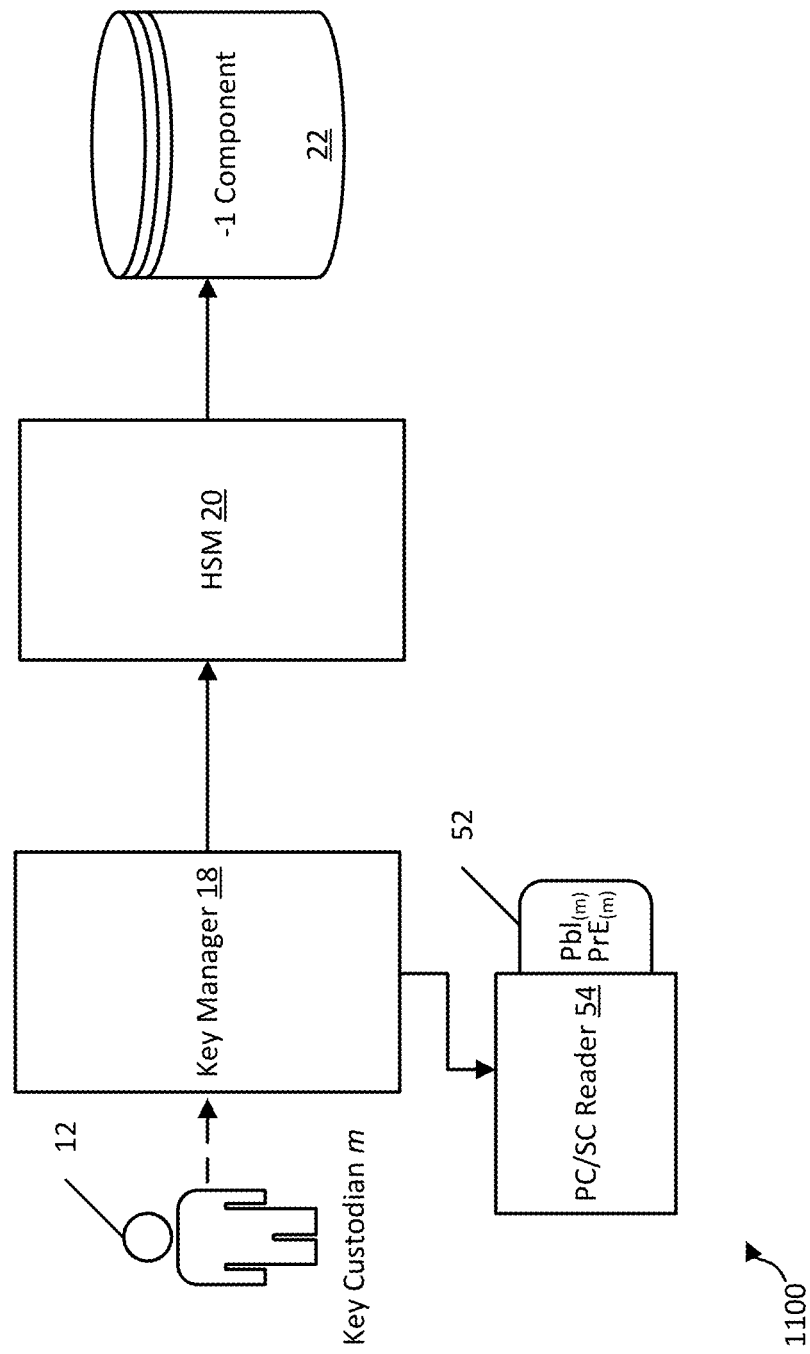
FIG. 15 is a schematic process diagram illustrating key component receipt by a key custodian as part of a remote asynchronous key extraction process, using the methods and systems described herein.

FIG. 15 illustrates a process 1100 by which key components may be extracted from a key 24 stored and managed by a HSM 20, according to an example embodiment. In the example shown, a key custodian 12 may use the key manager 18 to request a key component from the HSM 20. A key component 14 is then extracted from the key, and provided by the HSM 20 to the key manager 18. When the HSM 20 provides the key component 14 to the key manager 18, the HSM 20 will encrypt the key component using the public key of the public private key pair used for key extraction (e.g., for a key component m, $PbE_{(m)}$). This encrypted key component is returned to the key manager 18 which provides the encrypted key component to a physical credential for storage. As illustrated, the physical credential may be a smart card 52, and storage of the encrypted key component may be performed by a smart card reader 54.

Figure 16:
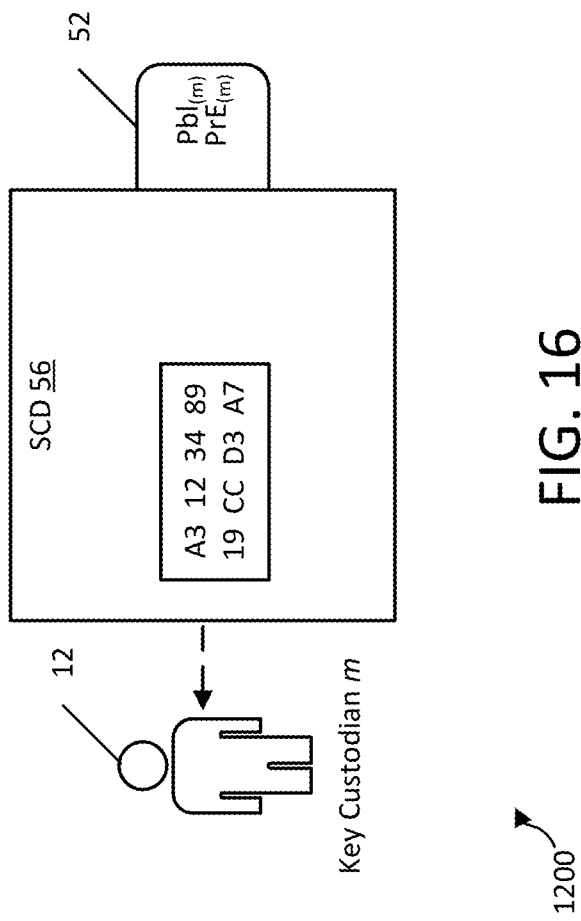
FIG. 16 is a schematic process diagram illustrating completed key component receipt by a key custodian as part of a remote asynchronous key extraction process, using the methods and systems described herein.

FIG. 16 illustrates a process 1200 by which a key component may be recorded by the key custodian, in accordance with an example embodiment. In the example shown the key custodian will provide the physical credential, such as a smart card, to a secure computing device. The physical credential, which stores a private key of the public private key pair used for key component extraction (e.g., for a key component m, $PrE_{(m)}$), will decrypt the encrypted key component, and the secure computing device will display in clear text the key component. The key custodian can then record the key component (e.g., physically on paper, or in alternative means). Once the key custodian confirms that he or she has recorded the key component via feedback provided at the secure computing device, the secure computing device will, cooperatively with the physical credential, delete the key component (both encrypted and decrypted versions thereof) from the physical credential.

Referring to FIGS. 1-16 generally, it is noted that the key insertion and extraction techniques described herein provide a number of advantages relative to the rigid, in person key component entry solution typically utilized. For example, the key insertion and extraction techniques described herein do not require each key custodian to be physically present at the HSM, and also do not require concurrent entry (or immediate, subsequent entry) of each key component at the HSM, allowing the key custodians to provide their respective key components at times that are more convenient to the key custodians. Still further, the methods and systems described herein allow the key managing officer to define limits on timing or location of the key custodians relative to each other.

Although the present disclosure has been described with reference to particular means, materials and embodiments, from the foregoing description, one skilled in the art can easily ascertain the essential characteristics of the present disclosure and various changes and modifications may be made to adapt the various uses and characteristics without departing from the spirit and scope of the present invention as set forth in the following claims.

The invention claimed is:

1. A method of enabling remote asynchronous master key entry, the method comprising:
for each key custodian of a plurality of key custodians:
receiving, at a key manager, a key component encrypted by a first injection key that is specific to a key custodian of the plurality of key custodians, wherein the key component is received from a remote location and stored at a time independent of other key components of a plurality of key components, and wherein the other key components are received from other key custodians of the plurality of key custodians and encrypted using different first injection keys associated with respective ones of the other key custodians;
for each key component received at the key manager:
receiving a selection of a key template, wherein the key template defines properties of a secure key to be generated from the plurality of key components;
receiving a key check value of the key component and a key check value of the secure key; and
transferring the key component to a hardware security module;
decrypting the key component with a second injection key at the hardware security module to obtain a decrypted key component;
calculating, at the hardware security module, the key check value of the key component;
determining, by the hardware security module, that the key check value of the key component calculated at the hardware security module matches the key check value of the key component received from the key custodian of the plurality of key custodians;
storing, responsive to the determining, the decrypted key component in a secure storage associated with the hardware security module, wherein storing the decrypted key component in the secure storage comprises adding the key component to the key template in the secure storage based on validation of the key check value of the key component and the key check value of the secure key received at the key manager against corresponding key check values stored with the key template in the secure storage;
upon receipt of the plurality of key components to form a complete set of key components including the key component from each key custodian of the plurality of key custodians, generating the secure key from the complete set of key components using the key template; and
responsive to successfully generating the secure key, deleting the plurality of key components and the key template.

2. The method of claim 1, further comprising, for each key custodian of the plurality of key custodians, receiving an identification of the key template in conjunction with the key component.

3. The method of claim 1, wherein the first injection key comprises a public key of a public/private key pair and the second injection key comprises a private key of the public/private key pair.

4. The method of claim 1, wherein the first injection key comprises a first symmetric key, and wherein the second injection key comprises a copy of the first symmetric key associated with the hardware security module.

5. The method of claim 1, further comprising:
generating at least one key for each key custodian of the plurality of key custodians;
for each key custodian of the plurality of key custodians, securely storing the at least one key in a memory of a respective credential device associated with the each key custodian; and
providing the each key custodian of the plurality of key custodians with the respective credential device having the at least one key stored thereon;
wherein the at least one key includes the first injection key.

6. The method of claim 5, wherein the respective credential device comprises a smart card.

7. The method of claim 5, wherein the at least one key further includes at least one extraction key.

8. The method of claim 7, wherein the at least one extraction key comprises a public/private key pair.

9. The method of claim 1, wherein one or more of the plurality of key custodians is located remotely from the hardware security module.

10. The method of claim 1, further comprising:
creating, via the hardware security module, a second secure key in the secure storage;
creating a second plurality of key components associated with the second secure key in the secure storage;
receiving a request, via the key manager, from the key custodian of the plurality of key custodians for a key component of a second plurality of key components, the key custodian being located remotely from the hardware security module;
encrypting the key component of the second plurality of key components with a first extraction key associated with the key custodian of the plurality of key custodians; and
transferring the encrypted key component of the second plurality of key components to a credential device associated with the key custodian of the plurality of key custodians.

11. The method of claim 10, wherein the credential device has a second extraction key securely stored thereon.

12. The method of claim 11, further comprising, at a secure computing device, causing the credential device to decrypt the encrypted key component of the second plurality of key components using the second extraction key.

13. The method of claim 12, further comprising: displaying the key component of the second plurality of key components to the key custodian of the plurality of key custodians; and upon receiving confirmation from the key custodian of the plurality of key custodians, deleting the key component of the second plurality of key components from the credential device.

14. The method of claim 10, wherein the first extraction key comprises a public key of a public/private key pair and the second extraction key comprises a private key of the public/private key pair.

* * * * *